US012663137B2

(12) United States Patent
Huber et al.

(10) Patent No.: US 12,663,137 B2
(45) Date of Patent: Jun. 23, 2026

(54) VEHICLE LIGHTS, IN PARTICULAR MOTOR VEHICLE HEADLIGHTS

(71) Applicant: ZKW Group GmbH, Wieselburg (AT)

(72) Inventors: Benjamin Huber, Allhartsberg (AT); Patrick Schmidt, Wieselburg (AT); Markus Zeuner, Mank (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/191,461

(22) Filed: Apr. 28, 2025

(65) Prior Publication Data

US 2025/0369588 A1 Dec. 4, 2025

(30) Foreign Application Priority Data

May 29, 2024 (EP) .................................... 24178891

(51) Int. Cl.

| | |
|---|---|
| ***F21S 45/33*** | (2018.01) |
| ***F21S 41/143*** | (2018.01) |
| ***F21S 41/20*** | (2018.01) |
| ***F21S 41/25*** | (2018.01) |
| ***F21S 45/43*** | (2018.01) |

(Continued)

(52) U.S. Cl.

CPC ............. *F21S 45/33* (2018.01); *F21S 41/143* (2018.01); *F21S 41/25* (2018.01); *F21S 41/2805* (2024.05); *F21S 45/43* (2018.01); *F21S 45/48* (2018.01); *F21Y 2115/10* (2016.08)

(58) Field of Classification Search

CPC .......... F21S 41/25; F21S 41/143; F21S 45/33; F21S 45/43; F21S 45/48

See application file for complete search history.

(56) References Cited

U.S. PATENT DOCUMENTS 8,465,189 B2 * 6/2013 Inoue ...................... F21V 29/67 362/547
9,121,561 B2 * 9/2015 Thullier .................. F21S 45/43

(Continued)

FOREIGN PATENT DOCUMENTS

CN 109519874 A 3/2019
CN 117570387 A 2/2024

(Continued)

OTHER PUBLICATIONS

Extended European Search Report for International application No. EP24178891 , dated Oct. 2, 2024.

*Primary Examiner* — Leah Macchiarolo
(74) *Attorney, Agent, or Firm* — Quinn IP Law

(57) ABSTRACT

Vehicle light (1), in particular motor vehicle headlight (6), comprising a number of light sources (2), a circuit carrier (3) having a front side (3*a*) and a rear side (3*b*), wherein the light sources (2) are arranged on the front side (3*a*) of the circuit carrier (3), a heat sink (4), wherein the heat sink (4) is attached flatly to the rear side (3*b*) of the circuit carrier (3), and a fan (5) fastened to the heat sink (4), wherein the heat sink (4) has a base body (4*a*) for flat contact with the rear side (3*b*) of the circuit carrier (3), a flange (4*b*) for receiving the fan (5), and an air duct (4*c*), wherein the flange (4*b*) encloses an air inlet opening (4*d*) opening into the air duct (4*c*), which is designed to receive an air flow (L) generated by the fan (5), wherein the air duct (4*c*) extends up to an air outlet opening (4*e*), wherein the heat sink (4) is formed in one piece from 3D-printed material.

15 Claims, 5 Drawing Sheets

Figure 1:
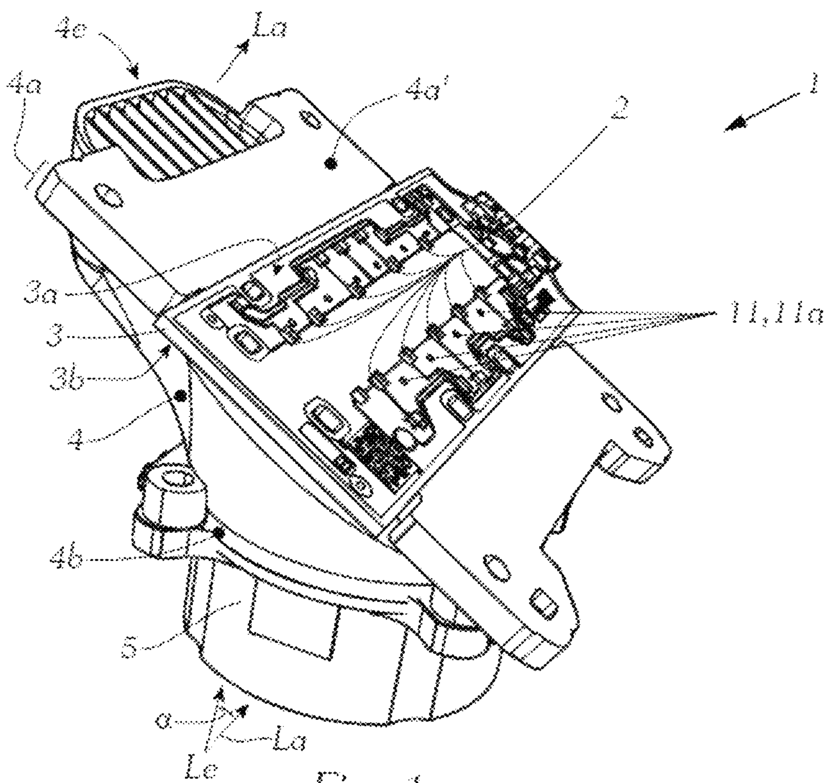

(51) Int. Cl.

| | |
|---|---|
| ***F21S 45/48*** | (2018.01) |
| *F21Y 115/10* | (2016.01) |

(56) References Cited

U.S. PATENT DOCUMENTS

| | | | | |
|---|---|---|---|---|
| 9,273,862 | B2 * | 3/2016 | Zeng | F21V 29/63 |
| 10,465,877 | B2 * | 11/2019 | Sanchez | F21V 29/60 |
| 2018/0372298 | A1 * | 12/2018 | Redjem Saad | F21S 45/49 |
| 2019/0331313 | A1 * | 10/2019 | Ruiz | F21S 45/435 |
| 2022/0186905 | A1 | 6/2022 | Sieme | |
| 2022/0196223 | A1 * | 6/2022 | Hlavach | F21S 45/49 |
| 2022/0341582 | A1 * | 10/2022 | Baerga | B33Y 80/00 |

FOREIGN PATENT DOCUMENTS

| | | | |
|---|---|---|---|
| DE | 102017106948 | A1 | 10/2018 |
| EP | 3418630 | A1 | 12/2018 |
| EP | 3671023 | A1 | 6/2020 |
| EP | 3561375 | B1 | 1/2022 |
| FR | 2964724 | A1 | 3/2012 |

* cited by examiner

Fig. 3a2

VEHICLE LIGHTS, IN PARTICULAR MOTOR VEHICLE HEADLIGHTS

The invention relates to a vehicle light, in particular a motor vehicle headlight, comprising a number of light sources, a circuit carrier having a front side and a rear side, wherein the light sources are arranged on the front side of the circuit carrier, a heat sink, wherein the heat sink is attached flatly to the rear side of the circuit carrier, and a fan fastened on the heat sink.

Numerous vehicle lights have become known from the prior art which have an active cooling system comprising a heat sink and a fan arranged thereon. An object of the invention is to provide a vehicle light which has better optimizable cooling with regard to the cooling performance in often limited installation space and/or limited construction geometry.

This object is achieved by a vehicle light of the type mentioned at the outset, in which according to the invention the heat sink has a base body for the planar contacting of the rear side of the circuit carrier, a flange for receiving the fan, and an air duct, wherein the flange encloses an air inlet opening into the air duct, which is configured to receive an air flow generated by the fan, wherein the air duct extends up to an air outlet opening, wherein the heat sink is formed in one piece from 3D printed material.

The number of light sources can preferably be at least 4, 8, 10, or more. The base body or a part thereof is not to be provided as a prefabricated substrate, but is to be 3D printed from the ground up. A one-piece construction is therefore understood to be a construction that is free of non-destructively detachable connections. The invention allows for space-optimized manufacturing of the vehicle light. The shape of the heat sink can be determined by a simulation based on artificial intelligence, so that abstract irregular shapes of the heat sink or its surface are conceivable. Due to an optimized air flow in the heat sink, the heated air can be directed into the housing. The weight saving in comparison to conventional vehicle lights is estimated to be approximately 10%. For the 3D printing, the 3D printing device having the designation "Desktop Metall P50" can be used. The heat sink can be printed and subsequently sintered.

In particular, it can be provided that the air outlet opening is designed such that the flow direction of the air flowing out through the air outlet opening is inclined at an angle $\alpha$ of at most 45° with respect to an incident flow angle of the air flowing in through the air inlet opening. This allows efficient maintenance of the air flow, a high flow velocity, and a low dynamic pressure on the outlet side.

Furthermore, it can be provided that the air duct is designed such that it tapers continuously in the direction of the base body starting from the air inlet opening toward the air outlet opening, wherein it is provided in particular that the cross section of the air duct decreases continuously starting from the air inlet opening toward the air outlet opening. This means that a width parallel to the base body decreases less than its depth measured in the normal direction to the base body. In particular, the width can be constant or also can taper. The flow velocity in the duct increases due to a taper in the duct. In this way, the cooling capacity at the end of the duct can be increased and/or dehumidification taking place at the end of the duct or in the surroundings of the end can be carried out more efficiently. For example, downstream elements such as a cover plate can be dehumidified more efficiently.

In particular, it can be provided that an inner housing engages at the air outlet opening, which inner housing mounts a projection lens arranged downstream from the circuit carrier for manipulating the light distribution emitted by the light sources, wherein the inner housing is enclosed by an outer housing, wherein the outer housing has a translucent cover plate arranged downstream from the projection lens, wherein the inner housing has an inner housing air duct which is configured to direct an air flow received through the air outlet opening in the direction of the cover plate. This can be used to dehumidify and/or to defrost the cover plate.

Furthermore, it can be provided that cooling structural elements are provided within the air duct, which extend originating from an inner duct wall and/or the base body within the air duct.

In particular, it can be provided that the cooling structural elements are cooling fins that extend parallel to a longitudinal extension of the air duct and/or are cooling pins.

Furthermore, it can be provided that the cooling structural elements are asymmetrical, irregularly arranged structures. These structures can be flow-optimized by means of AI despite their irregular shape. A combination with the above-mentioned cooling fins or cooling pins is also conceivable.

In particular, it can be provided that the base body has a flat area, wherein the flange is designed such that a fan mounted flat on the flange is inclined obliquely with respect to the flat area of the base body. Inclined means that the angle is, for example, between 20° and 70°, in particular between 30° and 60°. In this way, the required installation space can be reduced.

Furthermore, it can be provided that the position of the air inlet opening and the inclination of the fan with respect to the base body are selected such that an air flow after entering the air inlet opening, without additional deflection, hits at least a section of that area of the base body or of cooling structural elements protruding therefrom which is directly opposite to the light sources. This means that the rear side of the circuit carrier directly contacts the heat sink and the relevant cooling structural elements are located within an imaginary normal projection onto a contact plane formed in this way opposite to the light sources.

In particular, it can be provided that this area comprises a center of gravity of a polygon formed by the outermost LEDs. Preferably, all LEDs can also be captured "thermally".

In particular, it may be provided that said section comprises the area directly opposite to the highest concentration of light sources. The last three features can be combined particularly advantageously.

Furthermore, it can be provided that the light sources are flatly distributed on the front side of the circuit carrier, wherein the heat sink is arranged on the opposite surface of the rear side of the circuit carrier, in such a way that a normal projection of the base body onto the front side of the circuit carrier covers at least 70%, preferably at least 80% of the area formed by a virtual polygon whose corner points are formed by light sources, in such a way that all light sources that do not form corner points of the polygon lie within the polygon.

In particular, it can be provided that to increase the heat transfer from the front side to the rear side of the circuit carrier, heat transfer means are provided which penetrate the circuit carrier from its front side to its rear side.

Furthermore, it can be provided that at least some of the heat transfer means are designed as VIAS, which are preferably filled with heat-conducting material and are particularly preferably arranged in direct proximity to the light sources.

A VIA is understood as a "vertical interconnect access". Typically, a VIA is located in direct proximity to the light sources. This is understood as a distance of less than 5 mm to the closest light source.

In particular, it can be provided that the heat sink consists of an aluminum alloy. Aluminum alloys such as AlSi10Mg or alloy 6061, for example, come into consideration as materials. The shape of the heat sink including its fins, pins, and/or irregular structures can be finalized via a laser sintering method, for example.

Furthermore, it can be provided that the base body has integrally formed fastening means which are prepared for detachable connection to the circuit carrier or a housing engaging on the circuit carrier.

Furthermore, the invention relates to a motor vehicle headlight comprising a vehicle light according to the invention.

Further optional aspects of the invention are described hereinafter:

The fan can be designed as an axial fan. The 3D-printed heat sink can consist of an air duct and the base surface, wherein the body is made in one piece. The fan is attached directly on the air duct. Starting from the base surface, the optimized cooling geometry extends through the air duct, concentrated on the specified heat sources and an optimal air flow. After the main function of cooling, the air flow can be precisely guided, for example, in the direction of the cover plate for efficient further use.

The 3D printing method provides optimization of the cooling performance, the air flow, and the weight or installation size. The fan can be attached directly onto the flange of the air inlet opening of the air duct. The "blowing-out" opening of the air duct can protrude beyond the base body on at least one (of the four) sides and has integrally formed connecting elements for a detachable direct connection to the fan (screw eyelets, clips, etc.). The air duct "blowing-in" opening ends largely flow-tight with the fan housing (no secondary air). The air duct encloses heat-dissipating air-conducting structures arranged within the air duct and extending away from the base heat sink. The base of the structures is arranged directly opposite to the light sources. Structures are manufactured in one piece with the air duct and/or base body. The structures have symmetric regular (for example, ribs or pins) geometry and/or asymmetric irregular free-form geometry.

Figure 2:
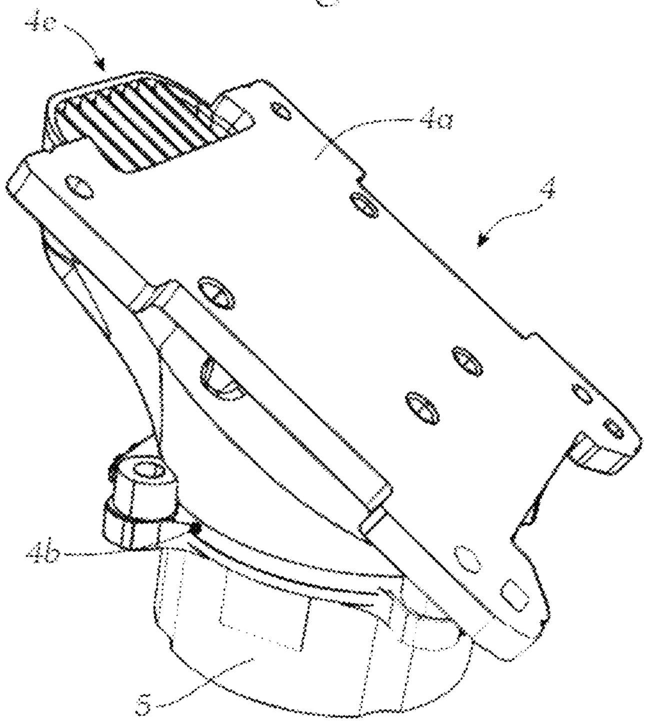
Figure 3A:
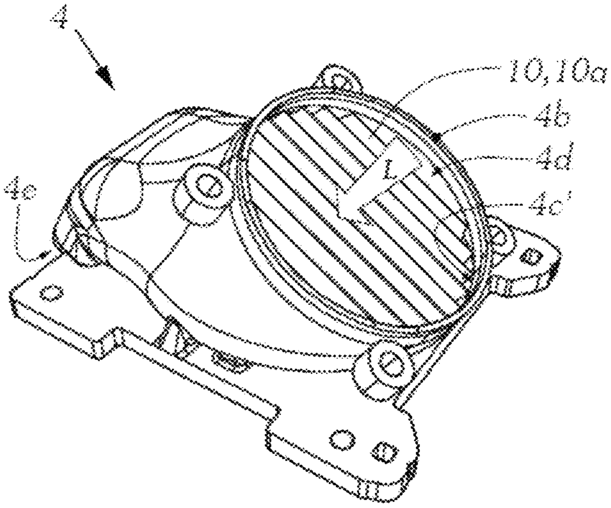
Figure 3B:
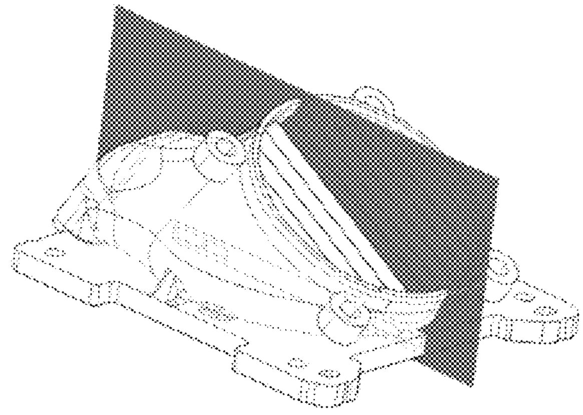
Figure 3B:
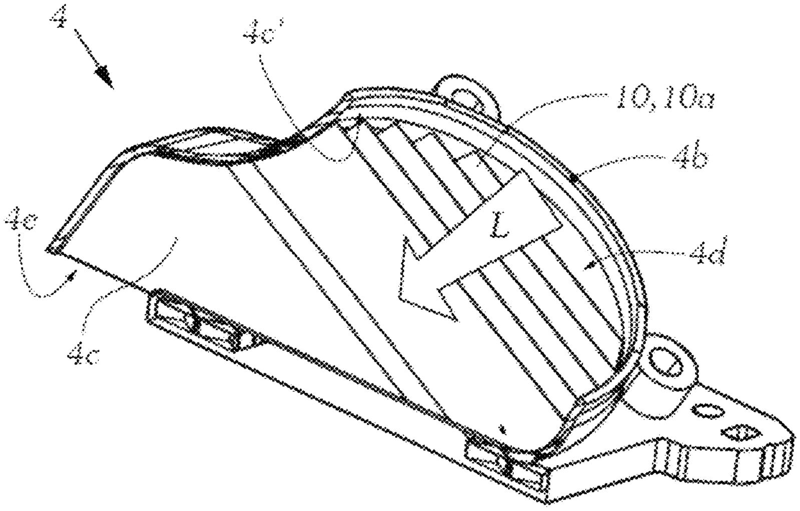
Figure 4:
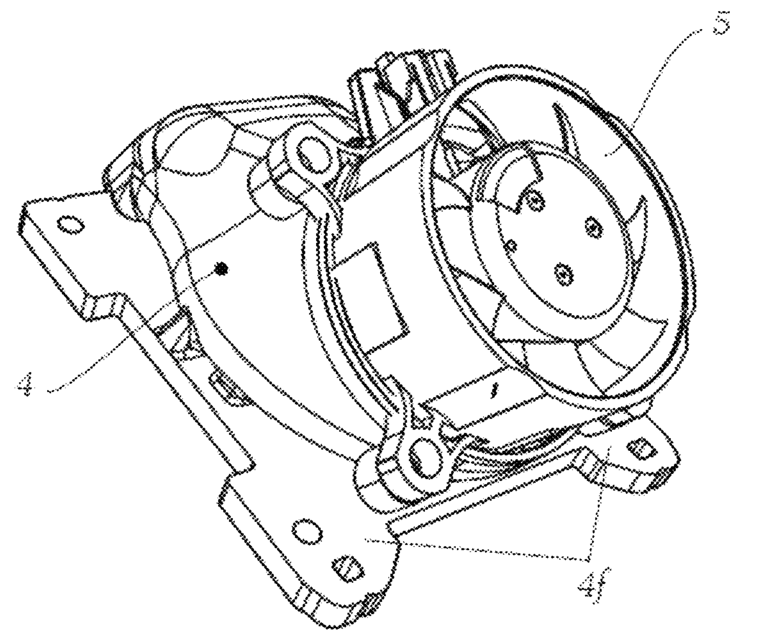
Figure 5:
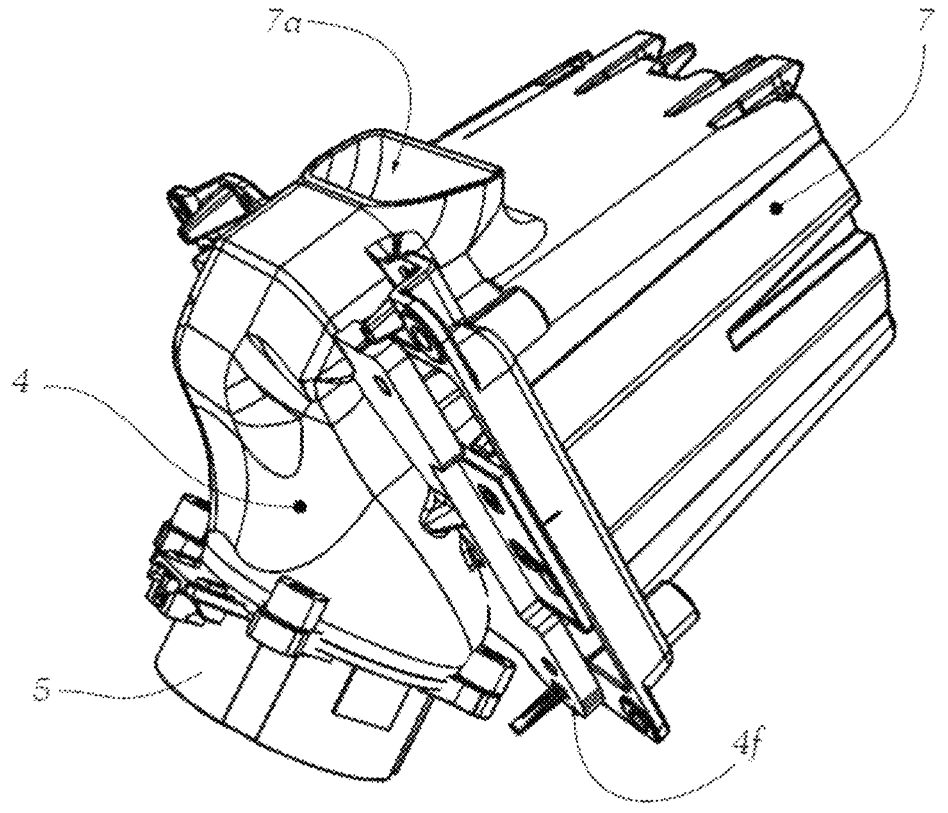
Figure 6:
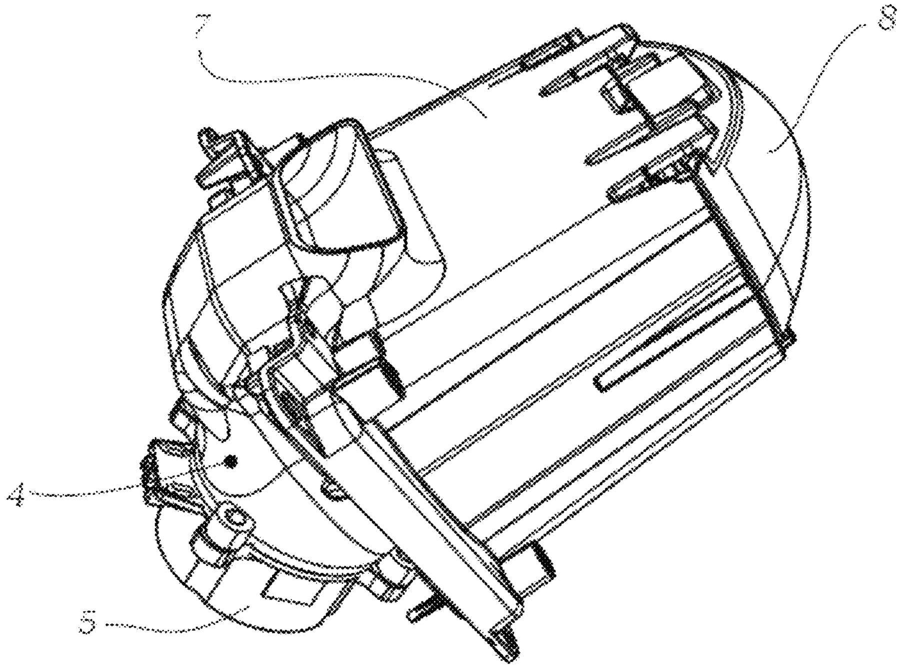
Figure 7:
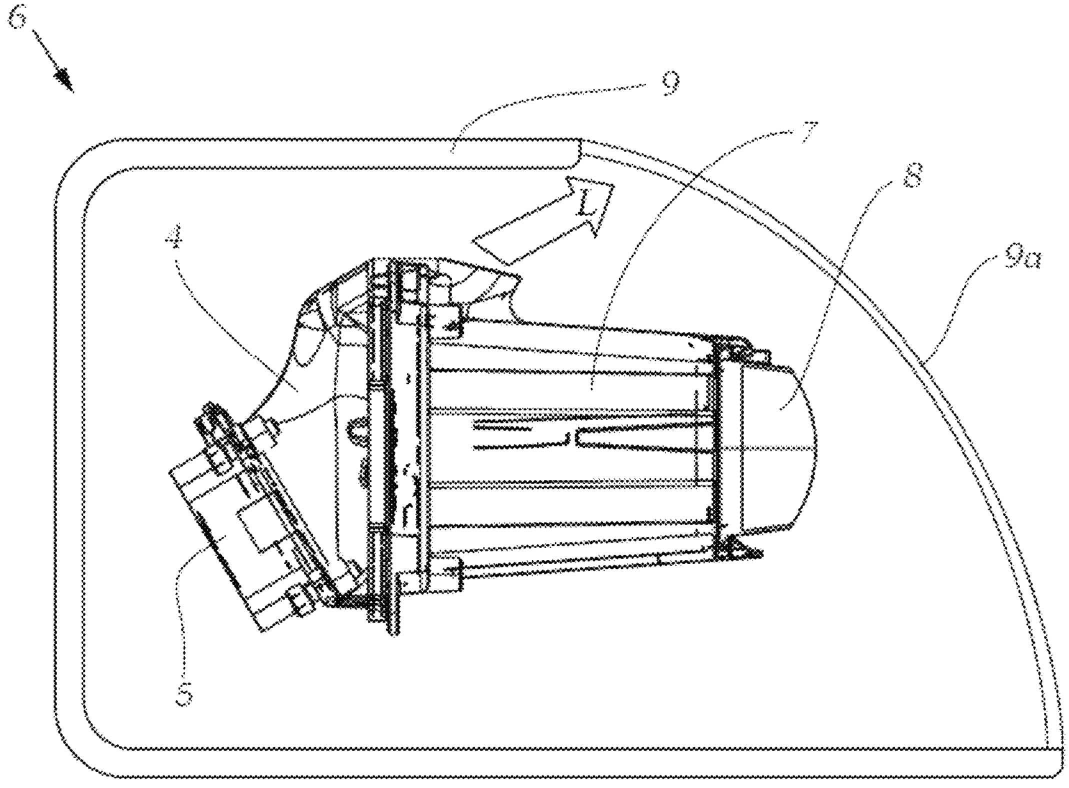
Figure 8:
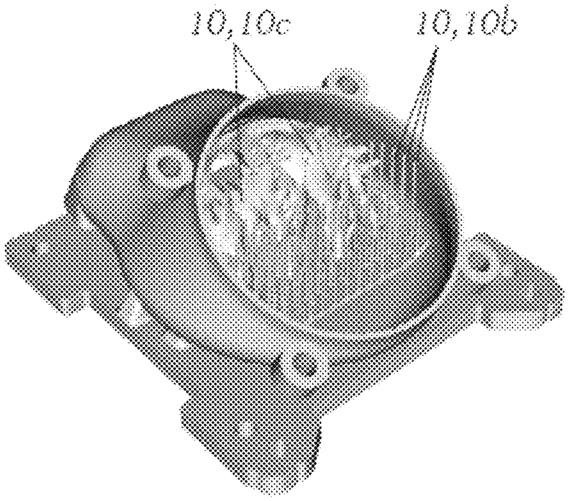
Figure 9:
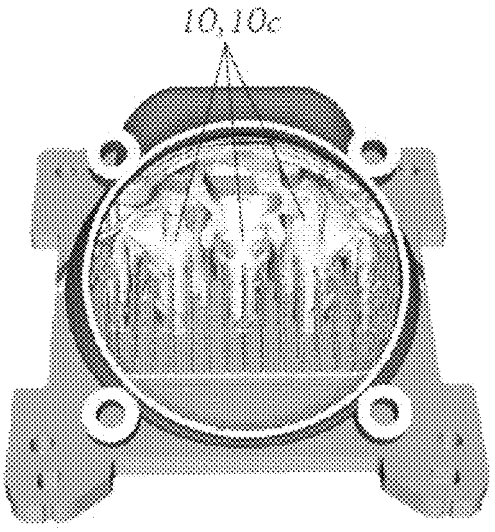
Figure 10:
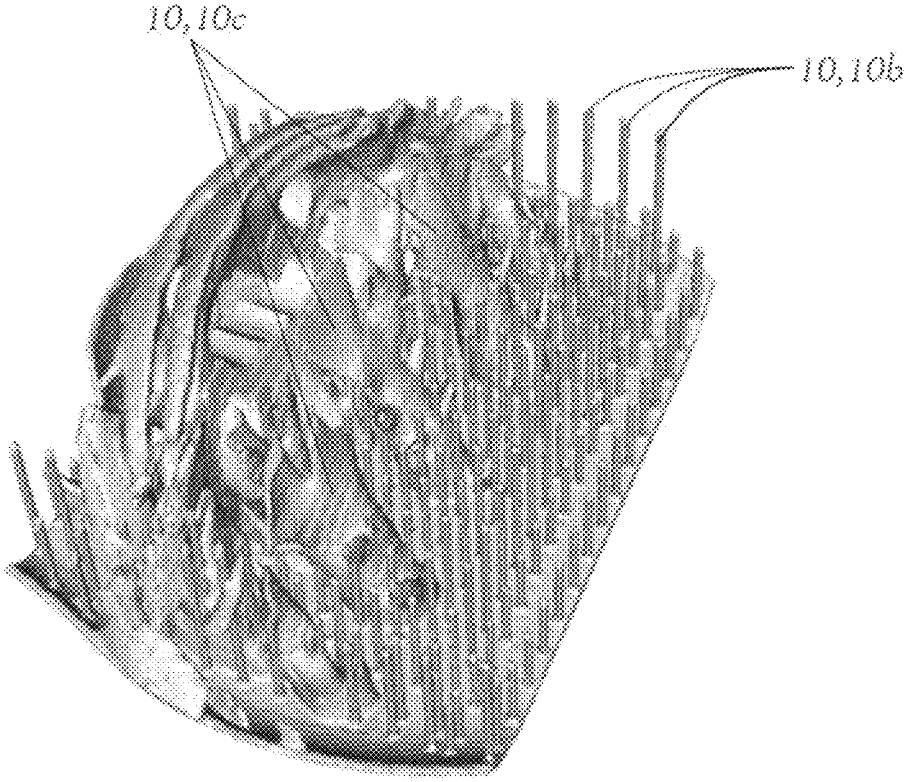

The invention is explained in more detail hereinafter on the basis of an exemplary and nonrestrictive embodiment illustrated in the figures. In the figures:

FIG. 1 shows a perspective view of a vehicle light according to the invention, FIG. 2 shows a perspective view of a heat sink including fan according to FIG. 1, FIG. 3*a* shows a view of the top of the heat sink excluding fan according to FIG. 2, FIG. 3*a*2 shows an indication of a section through FIG. 3*a*, FIG. 3*b* shows a sectional view corresponding to the indicated section according to FIG. 3*a*2, FIG. 4 shows a view of the top of the heat sink including fan, FIG. 5 shows an oblique view of the vehicle light according to FIG. 1 including an inner housing 7, FIG. 6 shows an oblique view of the vehicle light according to FIG. 5 including a projection lens, FIG. 7 shows a side view of the vehicle light according to FIG. 6 integrated into an outer housing including a translucent cover plate, so that a vehicle headlight is obtained, and FIGS. 8 to 10 show details of exemplary designs of cooling pins and structures.

In the following figures, unless otherwise indicated, the same reference signs denote the same features.

FIG. 1 shows a perspective view of a vehicle light 1 according to the invention, The vehicle light 1 can be designed as part of a motor vehicle headlight 6 (see FIG. 7) and comprises a number of light sources 2, a circuit carrier 3 having a front side 3*a* and a rear side 3*b*, wherein the light sources 2 are arranged on the front side 3*a* of the circuit carrier 3, a heat sink 4, wherein the heat sink 4 is attached flatly to the rear side 3*b* of the circuit carrier 3, and a fan 5 fastened to the heat sink 4.

With regard to FIG. 2, as well as 3*a*, 3*a*2, and 3*b*, it should be mentioned that the heat sink 4 has a base body 4*a* for the planar contacting of the rear side 3*b* of the circuit carrier 3, a flange 4*b* for receiving the fan 5, and an air duct 4*c*. The flange 4*b* encloses an air inlet opening 4*d* which opens into the air duct 4*c* and is designed to receive an air flow L generated by the fan 5. The air duct 4*c* extends to an air outlet opening 4*e*, wherein the heat sink 4 is formed in one piece from 3D printed material.

The air duct 4*c* can be designed such that it tapers continuously in the direction of the base body 4*a* starting from the air inlet opening 4*d* toward the air outlet opening 4*e*, wherein it is provided in particular that the cross section of the air duct 4*c* decreases continuously starting from the air inlet opening 4*d* toward the air outlet opening 4*e*.

Cooling structural elements 10 are provided within the air duct 4*c*, which extend starting from an inner duct wall 4*c*' and/or the base body 4*a* within the air duct 4*c*. In FIGS. 3*a* to 3*b*, cooling structural elements 10 in the form of cooling fins 10*a* are shown as examples, which extend parallel to a longitudinal extension of the air duct 4*c*. FIGS. 8 to 10, however, show pins 10*b* and asymmetric, irregularly arranged structures 10*c*.

With respect to FIG. 1, it is to be noted that the air outlet opening 4*e* is designed such that the flow direction of the air La flowing out through the air outlet opening 4*e* is inclined at an angle $\alpha$ of at most 45° with respect to an incident flow angle of the air Le flowing in through the air inlet opening 4*d*. The base body 4*a* preferably has a flat area 4*a*', wherein the flange 4*b* of the heat sink 4 is designed such that a fan 5 mounted flat on the flange 4*b* is inclined obliquely with respect to the flat area 4*a*' of the base body 4*a*.

The position of the air inlet opening 4*d* and the inclination of the fan 5 with respect to the base body 4*a* can be selected such that an air flow L after entering the air inlet opening 4*d*, without additional deflection, hits at least a section of that area of the base body 4*a* or of cooling structural elements 10 protruding therefrom which is directly opposite to the light sources 2. In particular, it can be provided that this area comprises a center of gravity of a polygon formed by the outermost LEDs. Preferably, all LEDs can also be captured "thermally". Furthermore, it may be provided that said section comprises the area directly opposite to the highest concentration of light sources 2.

Preferably, the light sources 2 are flatly distributed on the front side 3*a* of the circuit carrier 3, wherein the heat sink 4 is arranged on the opposite surface of the rear side 3*b* of the circuit carrier 3, in such a way that a normal projection of the base body 4 onto the front side 3*a* covers at least 70%, preferably at least 80% of the area formed by a virtual polygon whose corner points are formed by light sources 2, in such a way that all light sources 2 that do not form corner points of the polygon lie within the polygon.

To increase the heat transfer from the front side 3*a* to the rear side 3*b* of the circuit carrier 3, heat transfer means 11 can be provided which pass through the circuit carrier 3 from its front side 3*a* to its rear side 3*b*. At least some of the heat transfer means 11 can be designed as VIAS 11*a*, which are preferably filled with heat-conducting material and are particularly preferably arranged in direct proximity to the light sources 2.

FIG. 4 shows a view of the upper side of the heat sink 4 including the fan 5. It can be seen therein that the base body 4*a* can have integrally formed fastening means 4*f* which are prepared for detachable connection to the circuit carrier 3 or a housing 7 engaging on the circuit carrier 3.

FIG. 5 shows an oblique view of the vehicle light 1 according to FIG. 1 including an inner housing 7. FIG. 6 shows an oblique view of the vehicle light 1 according to FIG. 5 including a projection lens 8.

FIG. 7 shows a side view of the vehicle light according to FIG. 6 integrated into an outer housing including a translucent cover plate, so that a vehicle headlight is obtained. An inner housing 7 engages on the air outlet opening 4*e*, which mounts a projection lens 8 arranged downstream from the circuit carrier 3 for manipulating the light distribution emitted by the light sources 2. The inner housing 7 is enclosed by an outer housing 9. This has a translucent cover plate 9*a* arranged downstream of the projection lens 8, wherein the inner housing 7 has an inner housing air duct 7*a* which is designed to direct an air flow L received through the air outlet opening 4*e* in the direction of the cover plate 9*a*.

FIGS. 8 to 10 show details of exemplary designs of cooling pins 10*b* and cooling structures 10*c*.

The heat sink 5 preferably consists of an aluminum alloy.

The invention is not limited to the embodiments shown, but is defined by the entire scope of protection of the claims. Individual aspects of the invention or of the embodiments can also be taken up and combined with one another. Any reference signs in the claims are exemplary and serve only for the easier readability of the claims without restricting them.

REFERENCE SIGNS

1 vehicle light
2 light source
3 circuit carrier
3*a* front side of circuit carrier
3*b* rear side of circuit carrier
4 heat sink
4*a* base body of heat sink
4*b* flange of heat sink
4*c* air duct
4*d* air inlet opening
4*e* air outlet opening
4*f* fastening means
5 fan
6 motor vehicle headlight
7 inner housing
8 projection lens
9 outer housing
9*a* translucent cover plate
10 cooling structural elements
10*a* cooling fins (cooling structural elements)
10*b* pins (cooling structural elements)
10*c* asymmetric, irregularly arranged projections (cooling structural elements)
11 heat transfer means
11*a* VIAS (heat transfer means)
L air flow
La outflowing air
Le inflowing air
α angle of inflowing air/outflowing air

The invention claimed is:

1. A vehicle light (1), in particular a motor vehicle headlight (6), comprising a number of light sources (2), a circuit carrier (3) having a front side (3*a*) and a rear side (3*b*), wherein the light sources (2) are arranged on the front side (3*a*) of the circuit carrier (3), a heat sink (4), wherein the heat sink (4) is attached flatly to the rear side (3*b*) of the circuit carrier (3), and a fan (5) fastened on the heat sink (4), characterized in that the heat sink (4) has a base body (4*a*) for the planar contacting of the rear side (3*b*) of the circuit carrier (3), a flange (4*b*) to receive the fan (5), and an air duct (4*c*), wherein the flange (4*b*) encloses an air inlet opening (4*d*) opening into the air duct (4*c*), which is designed to receive an air flow (L) generated by the fan (5), wherein the air duct (4*c*) extends up to an air outlet opening (4*e*) from which the air flow (L) exits the vehicle light, wherein the air outlet opening (4*e*) is designed such that it is inclined at an angle (α) of at most 45° with respect to an incident flow angle of the air (Le) flowing in through the air inlet opening (4*d*), and wherein a flow direction of air (La) flowing out through the air outlet opening (4*e*) is non-parallel to a plane of contact between the base body (4*a*) and the rear side (3*b*) of the circuit carrier (3).

2. The vehicle light (1) as claimed in claim 1, wherein the air duct (4*c*) is designed such that a cross-section of the air duct (4*c*) it tapers continuously in the direction of the base body (4*a*) starting from the air inlet opening (4*d*) toward the air outlet opening (4*e*).

3. The vehicle light (1) as claimed in claim 1, wherein an inner housing (7) engages at the air outlet opening (4*e*), the inner housing mounting a projection lens (8) arranged downstream from the circuit carrier (3) for manipulating the light distribution emitted by the light sources (2), wherein the inner housing (7) is enclosed by an outer housing (9), wherein the outer housing (9) has a translucent cover plate (9*a*) arranged downstream from the projection lens (8), wherein the inner housing (7) has an inner housing air duct (7*a*) which is configured to direct an air flow (L) received through the air outlet opening (4*e*) in the direction of the cover plate (9*a*).

4. The vehicle light (1) as claimed in claim 1, wherein cooling structural elements (10) are provided within the air duct (4*c*), which extend starting from a duct inner wall (4*c*') and/or the base body (4*a*) within the air duct (4*c*).

5. The vehicle light (1) as claimed in claim 4, wherein the cooling structural elements (10, 10*a*, 10*b*, 10*c*) include cooling fins (10*a*) extending parallel to a longitudinal extent of the air duct (4*c*), and/or include pins (10*b*).

6. The vehicle light (1) as claimed in claim 4, wherein the cooling structural elements (10, 10*a*, 10*b*, 10*c*) include asymmetrical and irregularly arranged structures (10*c*).

7. The vehicle light (1) as claimed in claim 1, wherein the base body (4*a*) has a flat area (4*a*'), wherein the flange (4*b*) of the heat sink (4) is designed such that the fan (5), which is mounted flat on the flange (4*b*), is inclined obliquely with respect to the flat area (4*a*') of the base body (4*a*).

8. The vehicle light (1) as claimed in claim 1, wherein the position of the air inlet opening (4*d*) and an inclination of the fan (5) with respect to the base body (4*a*) are selected such that an air flow (L) after entering the air inlet opening (4_d_), without additional deflection, hits at least a section of that area of the base body (4_a_) or of cooling structural elements (10) protruding therefrom which is directly opposite to the light sources (2).

9. The vehicle light (1) as claimed in claim 8, wherein said section comprises the area directly opposite to the highest concentration of light sources (2).

10. The vehicle light (1) as claimed in claim 1, wherein, in order to increase the heat transfer from the front side (3_a_) to the rear side (3_b_) of the circuit carrier (3), heat transfer means (11) are provided which penetrate the circuit carrier (3) from its front side (3_a_) to its rear side (3_b_).

11. The vehicle light (1) as claimed in claim 10, wherein at least some of the heat transfer means (11) are designed as VIAS (11_a_), which are preferably filled with heat-conducting material and are particularly preferably arranged in direct proximity to the light sources (2).

12. The vehicle light (1) as claimed in claim 1, wherein the heat sink (4) consists of an aluminum alloy.

13. The vehicle light (1) as claimed in claim 1, wherein the base body (4_a_) has integrally formed fastening means (4_f_) which are prepared for detachable connection to the circuit carrier (3) or a housing (7) engaging on the circuit carrier (3).

14. A motor vehicle headlight (6), comprising a vehicle light (1) as claimed in claim 1.

15. The vehicle light (1) as recited in claim 1, wherein the heat sink is formed in one piece from a 3D-printed aluminum alloy.

* * * * *